(12) United States Patent
Connors et al.

(10) Patent No.: US 10,816,637 B2
(45) Date of Patent: Oct. 27, 2020

(54) SITE MATCHING FOR ASSET TRACKING

(71) Applicant: Chep Technology PTY Limited, Sydney (AU)

(72) Inventors: Chad Connors, Sydney (AU); Brian Lee, Boston, MA (US)

(73) Assignee: Chep Technology PTY Limited, Sydney (AU)

( * ) Notice: Subject to any disclaimer, the term of this patent is extended or adjusted under 35 U.S.C. 154(b) by 0 days.

(21) Appl. No.: 16/234,142

(22) Filed: Dec. 27, 2018

(65) Prior Publication Data

US 2020/0209343 A1 Jul. 2, 2020

(51) Int. Cl.
*G01S 5/02* (2010.01)
*H04W 4/02* (2018.01)
*H04W 4/021* (2018.01)
*H04W 4/029* (2018.01)

(52) U.S. Cl.
CPC ........... *G01S 5/0294* (2013.01); *H04W 4/021* (2013.01); *H04W 4/027* (2013.01); *H04W 4/029* (2018.02)

(58) Field of Classification Search
CPC ..... H04W 4/029; H04W 4/021; H04W 4/027; G01S 5/0294
USPC ...................................................... 455/456.1
See application file for complete search history.

(56) References Cited

U.S. PATENT DOCUMENTS

| | | | |
|---|---|---|---|
| 681,428 A | 8/1901 | Ambrose | |
| 5,774,876 A | 6/1998 | Woolley et al. | |
| 6,199,488 B1 | 3/2001 | Favaron et al. | |
| 6,294,114 B1 | 9/2001 | Muirhead | |
| 6,483,434 B1 | 11/2002 | Umiker | |
| 6,661,339 B2 | 12/2003 | Muirhead | |
| 6,669,089 B2 | 12/2003 | Cybulski et al. | |
| 6,718,888 B2 | 4/2004 | Muirhead | |
| 6,749,418 B2 | 6/2004 | Muirhead | |
| 6,943,678 B2 | 9/2005 | Muirhead | |
| 7,342,496 B2 | 3/2008 | Muirhead | |
| 7,735,430 B2 | 6/2010 | Muirhead | |
| 7,752,980 B2 | 7/2010 | Muirhead | |
| 7,789,024 B2 | 9/2010 | Muirhead | |
| 7,804,400 B2 | 9/2010 | Muirhead | |
| 7,874,256 B2 | 1/2011 | Muirhead | |
| 7,948,371 B2 | 5/2011 | Muirhead | |
| 7,963,235 B2 | 6/2011 | Muirhead | |

(Continued)

OTHER PUBLICATIONS

GoTo Pallets inc. "The future of the pallet pooling industry begins with the G2 Pallet." Retrieved capture from http://gotopallets.com for the date of Oct. 1, 2016, 77 pages.

(Continued)

*Primary Examiner* — William Nealon
(74) *Attorney, Agent, or Firm* — Kilpatrick Townsend & Stockton LLP

(57) ABSTRACT

A wireless RF tracking system comprising a transmitter (tag) and a receiver, the transmitter having a motion sensor, an RF communication module and a processor. The system has an algorithm configured to send a data ping from the transmitter via the RF communication module to the receiver, the algorithm being a smart location algorithm including both event-based ping methodology and time-based ping methodology. The system additional utilizes a geofencing system to expand the area around the smart location.

20 Claims, 5 Drawing Sheets

(56) References Cited

U.S. PATENT DOCUMENTS

| | | | |
|---|---|---|---|
| 7,999,670 B2* | 8/2011 | McClellan | G08G 1/207 340/539.13 |
| 8,077,040 B2 | 12/2011 | Muirhead | |
| 8,210,107 B2 | 7/2012 | Muirhead | |
| 8,229,473 B1 | 7/2012 | De La Rue | |
| 8,313,594 B2 | 11/2012 | Muirhead | |
| 8,331,862 B2 | 12/2012 | Muirhead | |
| 8,347,794 B2 | 1/2013 | Muirhead | |
| 8,585,850 B2 | 11/2013 | Muirhead | |
| 9,230,277 B2 | 1/2016 | Muirhead | |
| 9,466,198 B2* | 10/2016 | Burch | G08B 21/0213 |
| 9,679,237 B2 | 6/2017 | Linkesch et al. | |
| 9,813,850 B2 | 11/2017 | Lee et al. | |
| 9,947,196 B2 | 4/2018 | Lee et al. | |
| 2011/0169636 A1 | 7/2011 | Kadaba | |
| 2012/0252501 A1 | 10/2012 | Smith et al. | |
| 2013/0045760 A1* | 2/2013 | Obermeyer | G08B 21/0277 455/456.6 |
| 2013/0324151 A1* | 12/2013 | Lee | H04W 24/00 455/456.1 |
| 2014/0049392 A1 | 2/2014 | Wagner | |
| 2016/0205500 A1 | 7/2016 | Lee et al. | |
| 2016/0260059 A1* | 9/2016 | Benjamin | G06Q 10/0832 |
| 2017/0323412 A1 | 11/2017 | Muirhead | |

OTHER PUBLICATIONS

Roussel, J., "Making the Supply Chain Everyone's Business," May 9, 2014, 8 pages.

"Recommendations on the Grocery Industry Pallet System," written for the The Grocery Industry Pallet Subcommittee by Cleveland Consulting Associates, Jan. 1, 1992, 16 pages.

GoTo Pallets Marketing Brochure dated Oct. 12, 2016. Retrieved from http://gotopallets.com 8 pages.

Jihoon et al., "Geo-Fencing: Geographical-Fencing Based Energy-Aware Proactive Framework for Mobile Devices", Quality of Service (IWQOS), 2012 IEEE 20th International Workshop, Jun. 4, 2012, pp. 1-9.

International Application No. PCT/US2019/068476, "International Search Report and Written Opinion", dated Feb. 25, 2020, 13 pages.

* cited by examiner

SITE MATCHING FOR ASSET TRACKING

FIELD OF THE DISCLOSURE

The present disclosure generally relates to systems, apparatus and methods in the field of asset tracking.

BACKGROUND

In industry nowadays, success or failure depends in part upon knowing the up-to-date status of various assets. For example, in the freight delivery logistics, up-to-date knowledge of the location and, in some instances, the environment of various assets, such as pallet goods, provides efficient and reliable operations. Failure to maintain up-to-date status information can result in temporarily lost assets, sub-optimal use of the assets, and in the case of freight delivery, missed or late deliveries. A wireless tracking device or system is highly beneficial for solving the dilemma of knowing the physical location of the asset at a set point in time.

Technologies have been developed that greatly assist in tracking locations of assets, e.g., in real time. For example, global positioning systems (GPS) use wireless signals transmitted by earth-orbiting satellites to triangulate the position of a receiving device. Although relatively expensive, GPS receivers are capable of providing relatively accurate location information for virtually any point in the world so long as satellites are visible to the GPS.

More recently, radio frequency identification (RF or RFID) systems have been developed in which devices, often referred to as "tags," wirelessly communicate with readers. RF tracking systems are typically used in parcel tracking and sorting, container tracking, luggage tracking, retail tracking, warehouse tracking, and inventory operations. The RF tags may be either passive or active. Passive tags absorb signals transmitted by the reader and retransmit their own signals, such as identification information. While passive tags do not require a local power source, their resulting transmit range is relatively short, typically less than 5-10 meters. In contrast, active tags, which send a signal to indicate its location, include a local energy source (such as a battery) that improves transmission range. Depending on the wireless signal system used by the device, the range may be on the order of several meters or several hundred meters. Active tag systems have long range transmission range. The position signal or "ping" drains battery life of the transmitter, thus resulting in added operational cost of the system. Regardless of the type of tags used, knowledge of the location of the tags allows users to identify the location of assets that have the tags attached thereto.

Obtaining increased system value and decreased operational cost are important logistics and technical goals for designers of tracking systems. Increasing the value per ping, by decreasing the cost per ping, is one mechanism to decrease the operational cost of active systems. In an exception based asset management environment, the value per ping is the lowest under normal conditions. Merely increasing the period between subsequent pings, however, although it may decrease the cost per ping, does not intelligently decrease the cost per ping, as the extended period may miss critical movement of the tagged asset.

Sensor-based tracking systems are also known; sensor-based tracking systems provide more information than RFID systems. Shippers, carriers, recipients, and other parties often wish to know the location, condition, and integrity of shipments before, during, and after transport to satisfy quality control goals, meet regulatory requirements, and optimize logistics processes. However, such systems are typically expensive given the complexity of the sensors, and may provide extraneous and redundant item information.

Traditional location tracking systems either provide global location tracking using global positioning systems (GPS) or discrete location information using radio frequency identification (RFID) or similar technology to obtain real-time data on in-transit locations. These systems typically enable monitoring and management of various inventory systems. Unfortunately, such real-time systems fail to provide information regarding discrete location specific information such as the delivery and docking status, local events and transactions and physical condition of the delivered goods to customers or interested persons at different global locations.

SUMMARY

The present disclosure relates to an overlay-based asset location and identification system. More particularly, the present disclosure relates to various aspects involving systems, apparatus and methods that leverage an adaptive, hierarchical, context-aware wireless network that may use reduced power profiles, proactive movement notification, enhanced locations, and/or match the location information to an actual logistics site.

The value per ping is highest when the ping captures a logistics critical event. Logistics events can be broadly defined as a set of activities that collectively perform a logistics function. The activities within an event are typically performed in a specific sequence, with the sequence of activities subsequent to any specified activity being potentially dependent on conditions and decisions taken at the previous activity step. Examples of logistics events include loading a container into a transport vessel or vehicle, unloading a container from a transport vessel or vehicle, moving the container from one area of a warehouse to another area, etc.

The present disclosure provides a system, method and apparatus for optimizing value per ping for an asset tracking device by matching the location of the asset tracking device (tag) to a predetermined site at which a certain event occurs ("smart location"). Such a "smart location" logic provides a logistics event driven ping so that location information is associated with a logistics event or in business context. In such a manner, the value per ping is optimized, leading to increased battery life and decreased operational cost. To determine these logistics events, the asset tracking device is equipped with appropriate sensors, actuators, trigger mechanism(s), etc. The sensor(s) detect movements and confirm or recognize a predetermined pattern or sequence of movements. For example, one pattern is a set combination of lateral motion followed by a vertical (or sliding up) motion, which is indicative of loading into a cargo hold or into a vehicle. Another exemplary pattern is a set combination of lateral motion followed by decreasing vertical (or dropping) motion, which is indicative of unloading from a cargo hold or vehicle. Additional details regarding "smart location" algorithms are provided in U.S. Pat. Nos. 9,355,381 and 9,020,527, which are incorporated herein by reference. In some embodiments, a time factor may also be included in the smart location algorithm.

In most logistics and supply chain applications, an asset is moved along pre-determined routes or sites. To avoid an uncertainty in location accuracy, one can match the location determined by the tag to expected locations using logistics rules. In addition, a smart location can be defined by operation categories (e.g., service center "SC", manufacturer "E", distribution centers "DC", retailers "RT", etc.), business categories (food, construction, clothes, etc.), transaction meta data, etc.

In one embodiment, this disclosure provides a wireless RF tracking system comprising a transmitter (tag) and a receiver, the transmitter having a motion sensor, an RF communication module and a processor. The system has an algorithm configured to send a data ping from the transmitter via the RF communication module to the receiver, the algorithm being a smart location algorithm including both event-based ping methodology and time-based ping methodology.

In another embodiment, this disclosure provides an asset tracking system that utilizes a method to determine a location of an asset tracking device (tag) using a hierarchical transactional logistics flow. The method includes utilizing a plurality of identifiers associated with the one or more logistics events at a known location relative each of the plurality of identifiers. The asset tracking system also includes artificial intelligence, configured to identify, sort, and assign multiple type of asset movements and generate overlay information including an identification of a location correlated to at least one of the known locations.

In some embodiments of the disclosure, if a ping is issued due to logistics event, and a tracking device enters or exits or is within a virtual boundary set up around location site, the location of the tracking device will match with the location site.

In another embodiment, this disclosure provides a location-based service geo-fencing. The system includes an electronic virtual geo-fencing area affixed to the site location and configured to transmit a signal from the site location. The system also includes an electronic location trigger processing module to receive and process the signal transmitted by the site location tracking device into a location communication signal to be transmitted globally, wherein the electronic location trigger processing module is affixed to an asset whose discrete location and information are to be managed and tracked globally.

In another embodiment, the present disclosure provides a proximity algorithm which is set to a geo-fencing radius equal to a half of a distance between neighboring sites (in 2-D) or a distance between the center of the site registered, whichever distance is smaller between the two. When a proximity algorithm is applied, the smaller the geo-fencing area, the better local assignment it can get.

In another embodiment, the present disclosure provides site matching methods that include a step of determining the location of the asset tracking device by an exact algorithm, a pairing algorithm, an artificial intelligence (AI) trip report, or an AI transaction history report. Such methods can be used with an asset tracking system that includes service center (SC), manufacturer (E), distribution center (DC), and retailer (RT) sites. In exact site matching, the system assigns the site as either SC or E or DC or RT, based on a unique logistics event of the site. In site matching by pairing, the system assigns the site as either SC or E or DC or RT when the logistics event matches with the expected movement at the particular sites. In AI trip report site matching, the system assigns the site as either SC or E or DC or RT when the trip matches with a trip recorded in the artificial intelligent (AI) algorithm. In AI transaction history report site matching, the system assigns the site as either SC or E or DC or RT when the trip matches with historical data.

In the following description, certain aspects and embodiments will become evident. It should be understood that the aspects and embodiments, in their broadest sense, could be practiced without having one or more features of these aspects and embodiments. It should be understood that these aspects and embodiments are merely exemplary.

These and various other features and advantages will be apparent from a reading of the following detailed description.

BRIEF DESCRIPTION OF THE DRAWING

The disclosure may be more completely understood in consideration of the following detailed description of various embodiments of the disclosure in connection with the accompanying drawing, in which.

DETAILED DESCRIPTION

Figure 1:
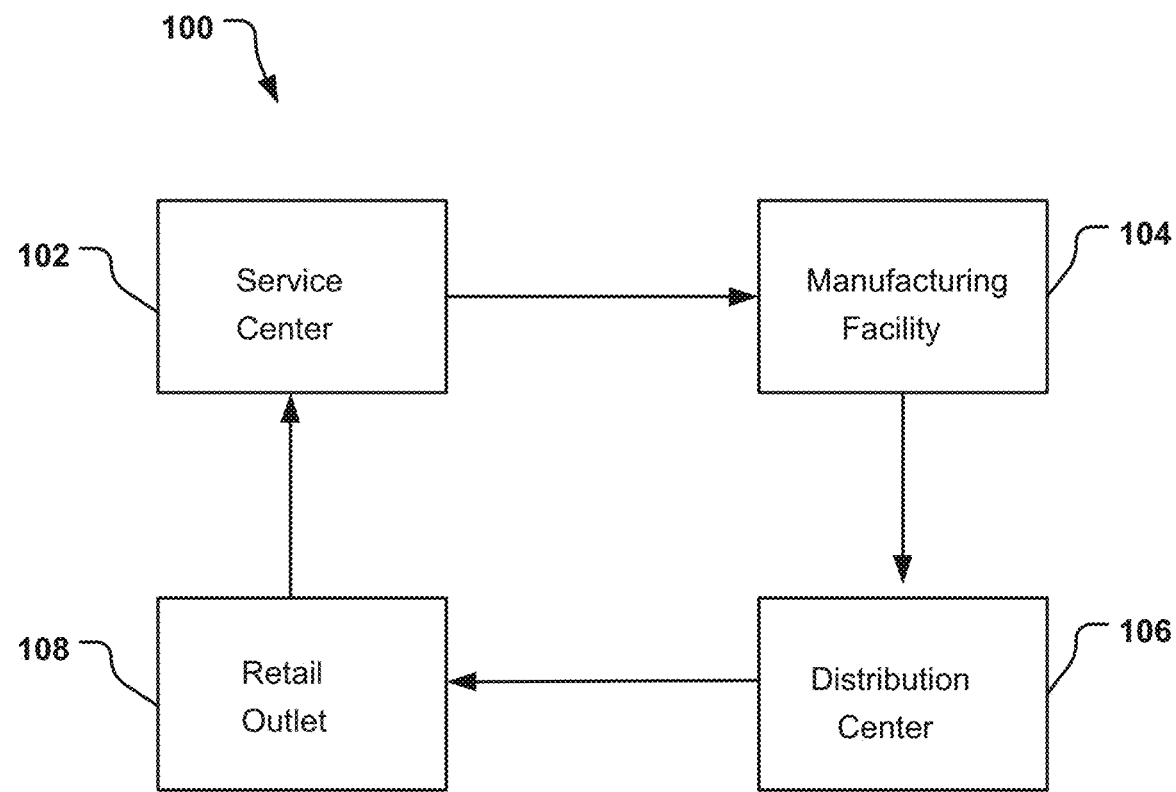
FIG. 1 is a schematic of an example of a route of an asset being tracked.

In this discussion, a "tracking device," "tracking tag," "tag," and variations thereof refers to a portable, signal emitting device configured for placement in or on an asset to be tracked, such as a container of goods (e.g., pallet, crate, box, container, and/or shipping vehicle, plane or ship, etc.). The "tracking device" includes a transmitter or a transmitter device for sending data wirelessly. A "tracking system" and variations thereof includes at least one tracking device with a transmitter, and a receiver for receiving the location signal from the tracking (transmitter) device(s).

In the following description, reference is made to the accompanying drawing that forms a part hereof and in which are shown by way of illustration at least one specific embodiment. In some instances, a reference numeral in a figure may have an associated sub-label consisting of an upper-case letter to denote one of multiple similar components. When reference is made to a reference numeral in the description without specification of a sub-label, the reference is intended to refer to all such multiple similar components.

The following description provides various specific embodiments. It is to be understood that other embodiments are contemplated and may be made without departing from the scope or spirit of the present disclosure. The following detailed description, therefore, is not to be taken in a limiting sense. While the present disclosure is not so limited, an appreciation of various aspects of the disclosure will be gained through a discussion of the examples provided below.

Location triggering systems enable the tracking of locations and all asset statuses in an automated and cost-effective fashion from its point of shipment to its point of delivery. Further, methods and systems track nodes and their movement while inside containers or vehicles/ships/planes. Better use radio elements of a node when deployed in such a logistics related wireless node network allow for improved positional awareness when managing items, nodes associated with the items, and/or containers for such managed items. To address these types of requirements and logistics related issues, one or more systems are needed that may leverage one or more elements of an adaptive, context-aware wireless node network that may use enhanced power profiles, proactive movement notification.

FIG. 1 illustrates an example of a route 100 of an asset through a logistics logic flow being tracked via a tracking device or 'tag'. The asset may be, for example, a cargo container, a pallet, a crate, or a box. The route 100 includes several loading or unloading activities, which are logistics events. In this embodiment, the asset has the tracking device affixed thereon or thereto or incorporated therein, so that the movement of the asset is being tracked. The tracking device includes a transmitter that will send a data ping to a (remote) receiver at each of the logistics events.

In FIG. 1, the asset tagged with the tracking device begins in a warehouse, storage building, or asset service center (SC) 102. Typically, at this stage, the asset is bare or empty, not having any goods loaded thereon, and the tracking device, particularly the transmitter, is typically in an inactive, sleep state. When the asset is loaded onto a truck or other transporter (e.g., truck, ship or airplane), the tracking device includes a motion sensor or other sensor(s) that determines whether or not a predetermined sequence of movements has occurred. Various embodiments may have different patterns or sequences of movements stored in the tracking device that when matching the corresponding to a particular movement (e.g., pallet load, warehouse shelved, forklift movement, etc.) If the correct sequence of movements has occurred, the transmitter device initiates the process to send a 'ping' to the receiver, advising the receiver that the asset has been moved and may send the particular movement profile triggered.

From the service center 102, the asset is moved to a manufacturing facility, manufacturer, producer or other product facility or emitter (E) 104 for a normal logistics transaction, where the asset is typically unloaded at a loading dock. If the unloading movements of the tagged asset from the vehicle are determined to be a predetermined sequence of unloading movements, the tracking device initiates the process to send a ping to the receiver.

In some embodiments, it is possible, although with a low probability, the asset is moved between two service centers (SC), e.g., for inventory balancing purpose, or to another location. Any site changes other than an authorized service center (SC) 102 and facility (E) 104 is considered an abnormal business transaction, and as such, generates an alarm. Sites within the normal stream of commerce are white listed to not generate an alarm. Areas and/or sites can be black listed such that readings there generate an alarm.

Returning to FIG. 1, at the facility (E) 104, goods are placed onto or into the tagged asset. Another series of predetermined movements (a logistics event) identifies when the loaded asset is placed onto a truck or other vehicle, and a ping is sent is sent to the receiver by the tracking device.

Throughout the continued route 100, if an activity such as loading or unloading is defined as a logistics event due to it meeting a predetermined pattern of movements, the tracking device initiates the process to send its data ping. In FIG. 1 along route 100, the tracked asset moves from the manufacturer facility (E) 104 to a distribution center (DC) 106. This route 100 is consistent with typical transport routes, as it has been established in the transport industry that assets from the manufacturer facility (E) 104 move to a distribution center (DC) site 98.8% of the time, to a retailer (RT) site 0.8% of the time, to other known locations 0.2% of the time, and to other unknown locations 0.2% of the time. Thus, in some embodiments, only movement to the distribution center (DC) 106 from the manufacturer facility (E) 104 is considered a logistics event.

During transport of the tagged asset from the manufacturing facility (E) 104 to the distribution center (DC) 106, the tracking device detects continuous movement and recognizes that the asset is experiencing a prolonged transport. Upon reaching the distribution center (DC) 106, the asset is unloaded at a loading dock that is identified by a pattern of movements.

At the distribution center (DC) 106, the asset may be loaded and sent to a retail outlet (RT) 108 and unloaded there. Again, the route 100 is consistent with typical transport routes, as it has also been established that assets from a distribution center (DC) 106 move mostly to a retailer (RT) 108 site 55% of the time, but also return to the service center (SC) 102 42% of the time, to other unknown locations 0.7% of the time, to a manufacturer facility (E) 104 (e.g., for re-use) 0.4% of the time. In some embodiments, only movement to the retailer outlet (RT) 108 from the distribution center (DC) 106 is considered a logistics event, whereas in other embodiments, both movement to the retailer outlet (RT) 108 and the service center (SC) 102 are logistics events, and the system is configured to allow for two possible logistics events. Other embodiments could have any number of logistics events.

Return of the tracked (and unloaded) asset to the distribution center (DC) 106 from the retail outlet (RT) 108 provides a logistics event when the asset is loaded onto the vehicle and another logistics event when the asset is unloaded. In typical established transport routes, assets from a manufacturing facility (E) 104 move mostly to the distribution center (DC) 84% of the time, to a service center (SC) 6.3% of the time, to other known locations 1.0% of the time, to a manufacturer facility (E) 104 (e.g., for re-use) 0.8% of the time. In some embodiments, thus, only movement to the distribution center (DC) 106 from the retailer (RT) 108 is considered a logistics event.

As described above, until a logistics event is detected by the senor(s) (e.g., motion sensor) of the tracking device, the transmitter of the tracking device is idle, in a sleep state, or otherwise off. When the logistics event (e.g., predetermined pattern of movement) is confirmed, the transmitter activates and initiates the process to send its data ping. Although various logistics events (loading, unloading) have been identified in the above scenario discussion, it is understood that other actions within the scenario could be identified as logistics events, or that some actions identified above may be removed as logistics events. For example, movement of the asset within a facility (e.g., within distribution center) may be a logistics event.

The physical location of the service center (SC) 102, the manufacturer (E) 104, the distribution center (DC) 106, and the retailer (RT) 108 are usually known, and fixed, with a known distance between the locations.

In one embodiment of the system described herein, a geo-fence (e.g., a location based geo-fence) is used with the asset tracking system; a geo-fence is a virtual boundary set up around a location so that a location within the geo-fence boundary is considered to be the center location of the geo-fence. Thus, when a geo-fence is incorporated in the system, a ping is only issued when both criteria are met—a logistics event (due to a pattern of movement), and the tracking device enters, exits, or is within the virtual boundary set up around the location site.

Figure 2:
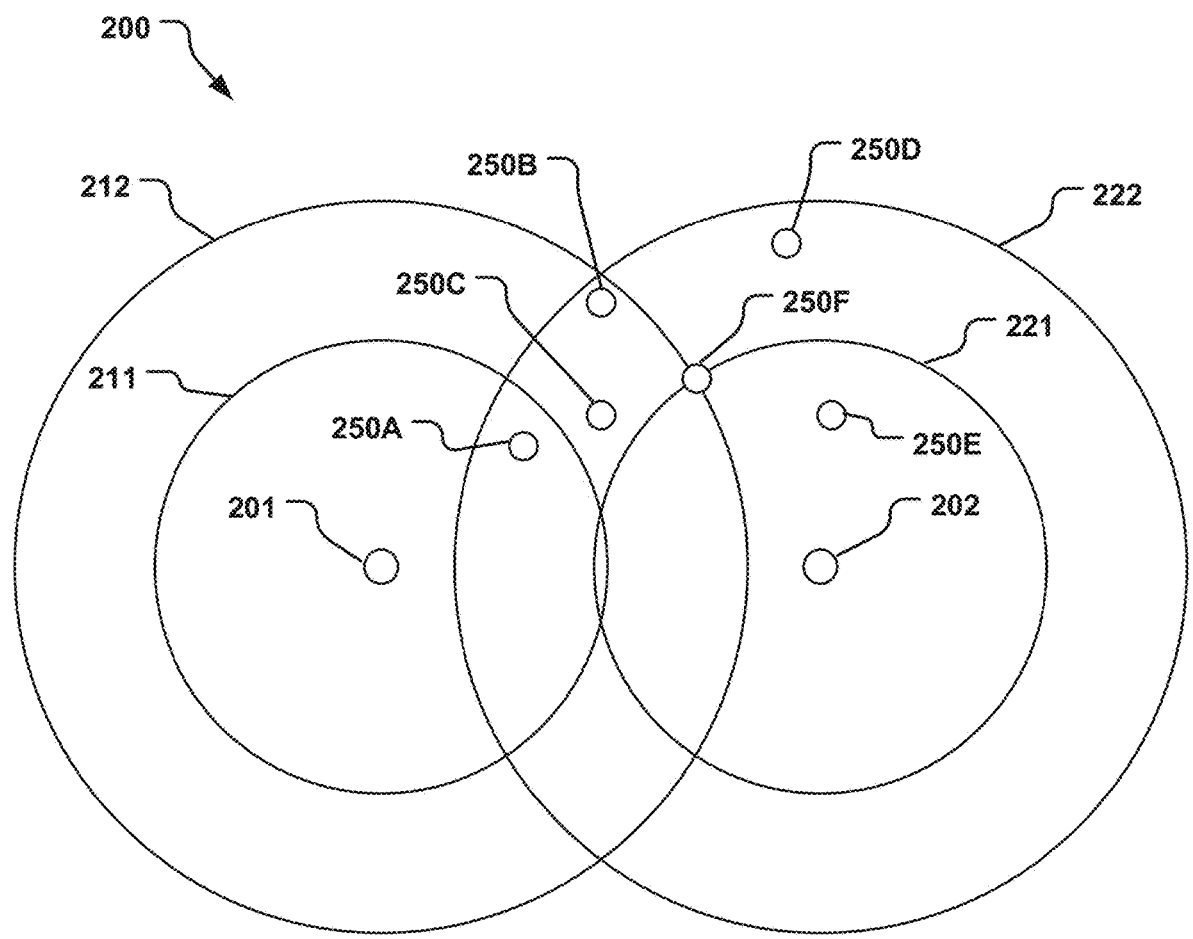
FIG. 2 is a schematic of an example of two sites with two different sizes of geo-fencing area.

FIG. 2 illustrates an example map 200 of two sites (locations) 201, 202 with two different geo-fencing size areas. A first known site 201 has a first geo-fence 211 and a second geo-fence 212, the first geo-fence 211 being smaller in area than the second geo-fence 212. A second known site 202 has a first geo-fence 221 and a second geo-fence 222, the first geo-fence 221 being smaller in area than the second geo-fence 222. The physical location of first known site 201 is separated by a fixed distance from second known site 202.

There is very little overlap between the geo-fencing area 211 and the geo-fencing area 221. However, a largeoverlap exists between the geo-fencing area 211 and the geo-fencing area 222 and between the geo-fencing area 221 and the geo-fencing area 212 with an even larger overlap between the geo-fencing area 212 and the geo-fencing area 222.

Multiple asset tracking devices are shown on the map 200, specifically, six tracking devices 250, specifically 250A, 250B, 250C, 250D, 250E and 250F, are shown in this embodiment. Tracking device 250A is located in the intersection of the geo-fencing area 211 and the geo-fencing area 222; tracking devices 250B, 250C are located in the intersection of the geo-fencing area 212 and the geo-fencing area 222; tracking device 250D is located in the geo-fencing area 222; tracking device 250E is located in the geo-fencing area 221, and tracking device 250F is located in the geo-fencing area 221 and the geo-fencing area 212.

As seen in FIG. 1, movement of the asset from one site to another site, or within a geo-fencing area of the site, is predictable. Therefore, a hierarchical transactional logistics flow can be applied to the asset tracking device. A location of the asset tracking device can also be predicted based on the logistics event and type of the movement of the asset. In one embodiment, the logistics logic flow of the asset is applied. When a wrong address is applied to an actual address, this creates results in systematic accuracy of a predicted site. Therefore, it is important to establish an integrity of a master data and transaction data since the system depends master data and transaction data heavily.

Returning to FIG. 2, when a logistics event is detected and a ping is issued, the location of the asset tracking device 250 could be matched to either to the site 201 or the site 202 depending on the radius and/or area of the geo-fencing areas 211, 212 and 221, 222, and the logistics logic flow. When a logistics logic flow is applied, the bigger the geo-fencing area the less probability that the asset tracking device is assigned incorrectly to the correct site.

A proximity algorithm may be used to set the geo-fencing radius and/or area differently in different situations. The proximity algorithm sets the geo-fencing radius equal to half of the distance between neighboring area sites (in 2-D) (e.g., one half of the distance between area 211 and area 221) or a distance between the center of the site registered (e.g., the distance between site 201 and site 202), which ever smaller between two. Therefore, the proximity algorithm prefers a bigger geo-fencing area than a smaller geo-fencing area. The smaller geo-fencing area may, e.g., mislead the site matching accuracy. When a proximity algorithm is applied, smaller the geo-fencing area, the better local assignment it can get. Therefore, the proximity algorithm could practically make a smaller geo-fencing within the density map.

Figure 3:
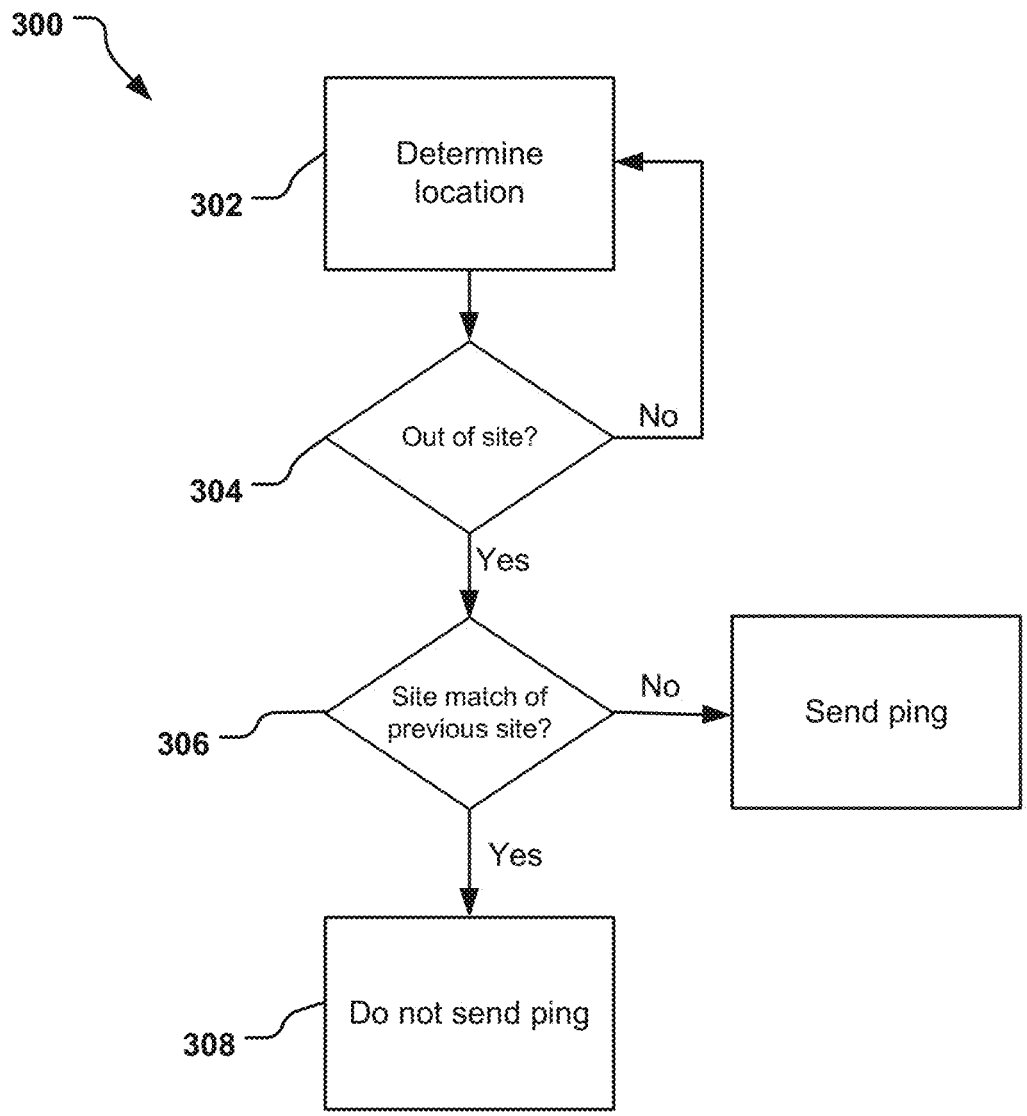
FIG. 3 is a flow chart of an example of logic flow of a logistics event.

FIG. 3 illustrates an example matching logic flow chart 300 for whether or not a tracked location represents a logistics event. After a logistics event is detected and a ping is issued in operation 302, in the subsequent operation 304, it is determined whether or not the location of the tracking device matches with a site location based on pre-determined geo-fencing area. If the tracking device is within the geo-fencing area of the site location, the location of the tracking device is assigned to the previous site before the logistics event is detected (operation 306); that is, the location recorded for the tracking device is its previous location. Conversely, if the tracking device is not within the geo-fencing area of the site location (in operation 304), the tracking device returns to operation 302 to wait for another logistics event to send another ping. When the tracking device leaves the geo-fencing area, the location of the tracking device will match to a new site location based on the hierarchical transactional logistics flow.

Figure 4:
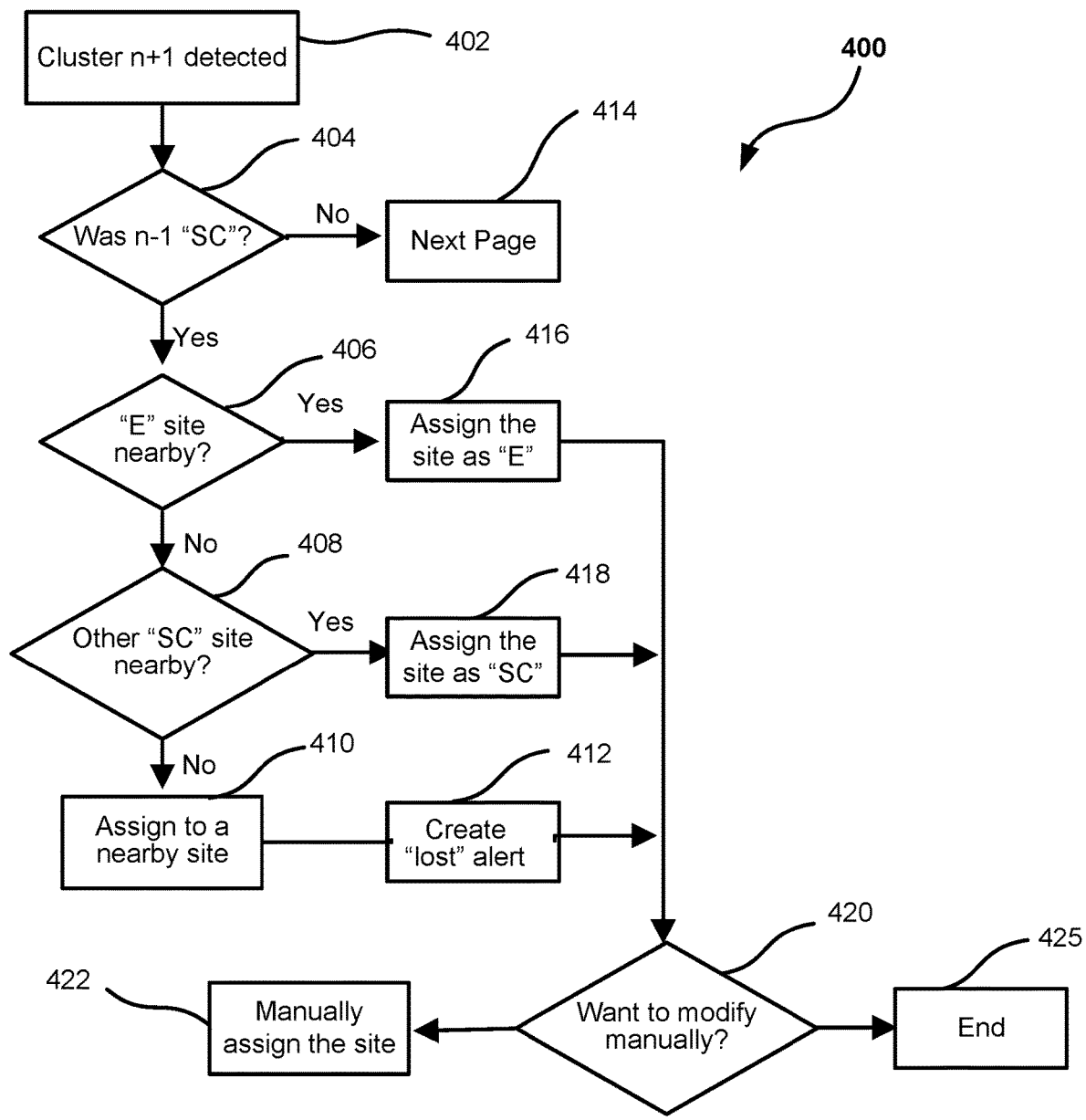
FIG. 4 is an example of smart location using a hierarchical transactional logistics flow at service center (SC) site.

FIG. 4 illustrates an example of a smart location logic flow chart 400 using a hierarchical transactional logistics flow at service center (SC) site 102. When a logistics event is detected and a ping is issued, a first decision is made (operation 404) as to whether or not the two-previous site matching (n−1) was a service center (SC) 102. As illustrated earlier in FIG. 1, based on historical transaction data, the next matching site should be manufacturer site (E) (operation 406) 104 or another service center (SC) 102 for inventory balancing purpose or to other location (operation 414).

In operation 406, a second decision logic, it is determined whether or not a manufacturing site (E) 104 is close by. If yes, that site is assigned as a manufacturing site (E) 104 in operation 416. If not, as a third decision logic, it is queried in operation 408 whether or not another service center (SC) 102 is close by (operation 408). If yes, the location of the tracking device is matched to the service center site (SC) (operation 418) 102, if not, assign a location of the racking device to any nearest site (operation 410), from which is issued a "lost" alarm (operation 412).

After the site was assigned as a manufacturing site (E) (operation 416) 104, or as a service center (SC) (operation 418) 102 or after it is deemed lost (operation 412), there is the opportunity to manually modify or assign the location of the tracking device (operation 420). If yes, the site is changed (operation 422). The process ends at operation 425.

Figure 5:
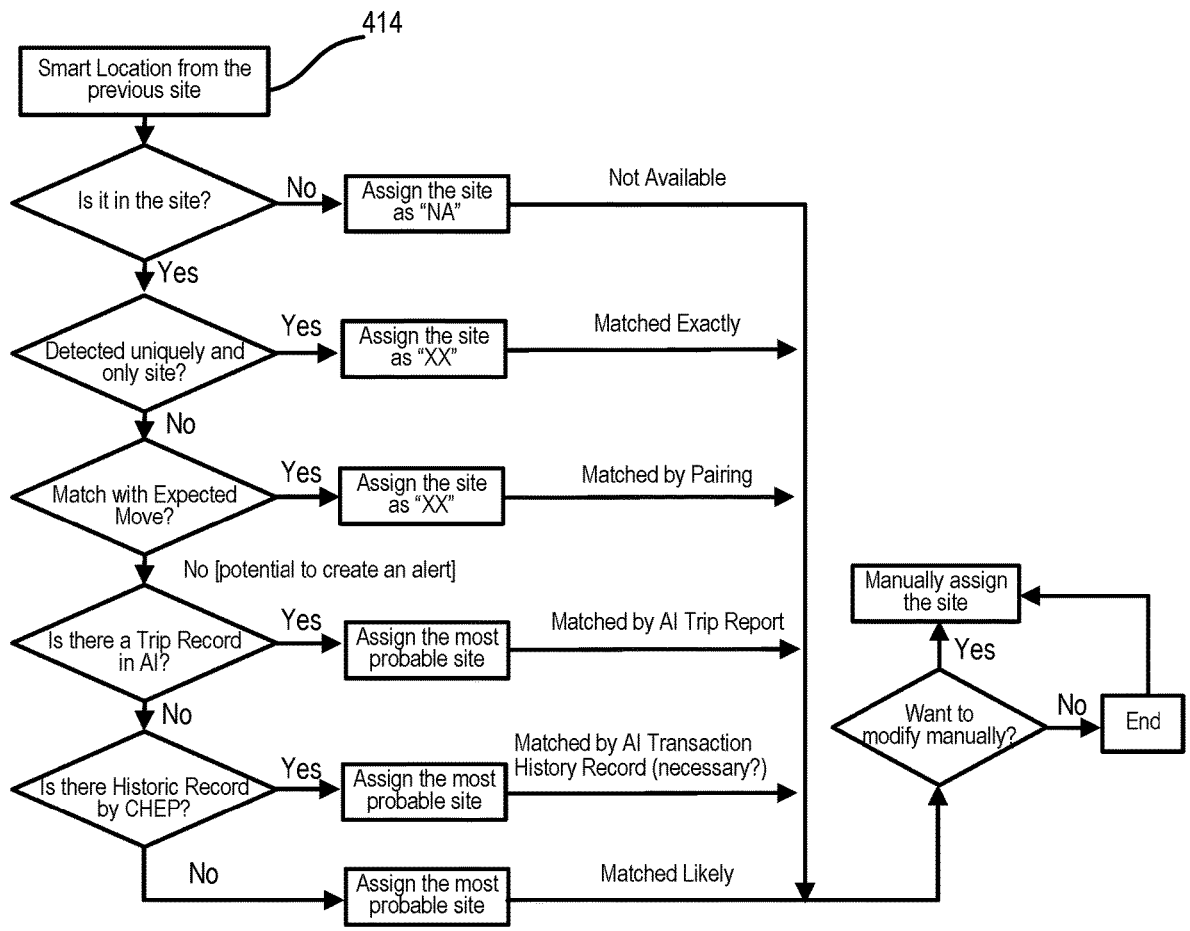
FIG. 5 is an example of technical entitlement flow.

FIG. 5 illustrates an example of technical entitlement logistics flow chart 500. This chart begins at operation 414 from FIG. 4; a smart location is applied to the previous location site (operation 414). After a logistics event is detected and a smart location algorithm is applied, then a technical entitlement algorithm is applied. When this site is neither SC nor E nor DC nor RT, then assign the site as not applicable site "NA". When this site is one of four possibility sites (SC, DC, E, RT), and is unique, and only site, then assign the site as either SC or E or DC or RT. This is called "site matched exactly". When this site is one of four possibility sites (SC, DC, E, RT), and the logistics event matches with expected movement at the particular sites such as SC, DC, E, RT, then assign the site as either SC or E or DC or RT. This is called "site matched by pairing". When this site is one of four possibility sites (SC, DC, E, RT), and the trip matches with trip recorded in artificial intelligent (AI) algorithm, then assign the site to most probable site as either SC or E or DC or RT. This is called "site matched by AI trip report". When this site is one of four possibility sites (SC, DC, E, RT), and the trip matches with historical data, then assign the site to most probable site as either SC or E or DC or RT. This is called "site matched by AI transaction history record". When this site is one of four possibility sites (SC, DC, E, RT), and the trip does not match with historical data, then assign the site to the nearest site either SC or E or DC or RT. This is called "matched likely". In this example, it is always an opportunity to assign the location of the tracking device manually.

As described above and illustrated in the figures, the present disclosure is directed to various embodiments of a tracking device that leverage an adaptive, hierarchical, context-aware wireless network that may use reduced power profiles, proactive movement notification, enhanced locations, and/or match the location information to an actual logistics site.

The above specification and examples provide a complete description of the structure and use of exemplary embodiments of the invention. The above description provides specific embodiments. It is to be understood that other embodiments are contemplated and may be made without departing from the scope or spirit of the present disclosure. The above detailed description, therefore, is not to be taken in a limiting sense. While the present disclosure is not so limited, an appreciation of various aspects of the disclosure will be gained through a discussion of the examples provided.

Unless otherwise indicated, all numbers expressing feature sizes, amounts, and physical properties are to be understood as being modified by the term "about," whether or not the term "about" is immediately present. Accordingly, unless indicated to the contrary, the numerical parameters set forth are approximations that can vary depending upon the desired properties sought to be obtained by those skilled in the art utilizing the teachings disclosed herein.

As used herein, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "bottom," "lower", "top", "upper", "beneath", "below", "above", "on top", "on," etc., if used herein, are utilized for ease of description to describe spatial relationships of an element(s) to another. Such spatially related terms encompass different orientations of the device in addition to the particular orientations depicted in the figures and described herein. For example, if a structure depicted in the figures is turned over or flipped over, portions previously described as below or beneath other elements would then be above or over those other elements.

Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A method of determining locations of tracking devices, the method comprising:
   monitoring a tracking device for a predetermined sequence of movements;
   responsive to detecting the predetermined sequence of movements, determining whether a location of the predetermined sequence of movements of the tracking device occurred entirely within a predetermined event site matching the predetermined sequence of movements, the predetermined event site being a logistics event site having a geo-fencing area therearound;
   responsive to the location being within the predetermined event site matching the predetermined sequence of movements, causing a data ping to be sent with location information; and
   monitoring the tracking device for a second predetermined sequence of movements;
   responsive to detecting the second predetermined sequence of movements, determining whether a second location of the second predetermined sequence of movements of the tracking device is within the predetermined event site; and
   responsive to the second location not being within the predetermined event site, causing a data ping to be sent with second location information.

2. The method of claim 1, wherein monitoring the tracking device for the predetermined sequence of movements comprises monitoring a combination of lateral and vertical motions.

3. The method of claim 2, wherein the predetermined sequence of movements comprises a predetermined pattern of movements in a single location.

4. The method of claim 3, wherein the predetermined pattern of movements in the single location comprises a loading event or an unloading event.

5. The method of claim 1, wherein the location is a first predetermined event site and the second location is a second predetermined event site.

6. The method of claim 5, wherein the second predetermined event site is an expected second predetermined event site.

7. The method of claim 1, further comprising, after seconding the data ping with the second location information, manually assigning the second location as a predetermined event site.

8. The method of claim 1, further comprising accessing a hierarchical logistics flow for the tracking device, wherein the hierarchical logistics flow comprises an ordered sequential list of predetermined event sites through which the tracking device is likely to move.

9. A non-transitory computer-readable medium comprising instructions that, when executed by one or more processors, cause the one or more processors to perform operations comprising:
   monitoring a tracking device for a predetermined sequence of movements;
   accessing a hierarchical logistics flow for the tracking device, wherein the hierarchical logistics flow comprises an ordered sequential list of predetermined event sites through which the tracking device is likely to move, wherein the hierarchical logistics flow comprises a first predetermined event site, a second predetermined event site, a third predetermined event site, a probability predicting how often the tracking device will move from the first predetermined event site to the second predetermined event site, and a probability predicting how often the tracking device will move from the first predetermined event site to the third predetermined event site;
   responsive to detecting the predetermined sequence of movements, determining whether a location of the predetermined sequence of movements of the tracking device occurred entirely within a predetermined event site matching the predetermined sequence of movements, the predetermined event site being a logistics event site having a geo-fencing area therearound; and
   responsive to the location being within the predetermined event site matching the predetermined sequence of movements, causing a data ping with location information to be sent.

10. The non-transitory computer-readable medium of claim 9, wherein the operations further comprise:
    after the data ping is sent, monitoring the tracking device for a second predetermined sequence of movements;
    responsive to detecting the second predetermined sequence of movements, determining whether a second location of the second predetermined sequence of movements of the tracking device is within the predetermined event site; and responsive to the second location being within the predetermined event site, not sending a data ping.

11. The non-transitory computer-readable medium of claim 9, wherein the logistics event site is one of a service center, manufacturer, distribution center, or retailer.

12. The non-transitory computer-readable medium of claim 9, wherein monitoring the tracking device for the predetermined sequence of movements comprises monitoring based on time between movements in the predetermined sequence of movements.

13. The non-transitory computer-readable medium of claim 9, wherein the geo-fencing area around the predetermined event site overlaps with a geo-fencing area around a second predetermined event site in the hierarchical logistics flow.

14. The non-transitory computer-readable medium of claim 13, further comprising determining whether to assign the predetermined event site or the second predetermined event site to the tracking device based at least in part on the hierarchical logistics flow.

15. A system comprising:
one or more processors; and
one or more memory devices comprising instructions that, when executed by the one or more processors, cause the one or more processors to perform operations comprising:
monitoring a tracking device for a predetermined sequence of movements;
accessing a hierarchical logistics flow for the tracking device, wherein the hierarchical logistics flow comprises an ordered sequential list of predetermined event sites through which the tracking device is likely to move;
responsive to detecting the predetermined sequence of movements, determining whether a location of the predetermined sequence of movements of the tracking device occurred entirely within a predetermined event site matching the predetermined sequence of movements, the predetermined event site being a logistics event site having a geo-fencing area therearound; and accessing a previous predetermined event site in the hierarchical logistics flow to which the tracking device was assigned prior to detecting the predetermined sequence of movements;
assigning the predetermined event site as a current location of the tracking device based at least in part on the previous predetermined event site, the hierarchical logistics flow and the location being within the predetermined event site matching the predetermined sequence of movements; and
responsive to the predetermined event site being assigned as the current location of the tracking device, causing a data ping with location information to be sent.

16. The method system of claim 15, wherein the operations further comprise, responsive to the predetermined event site being an unauthorized site, generating an alarm.

17. The system of claim 15, wherein the previous predetermined event site comprises a service center, and the predetermined event site comprises a manufacturing site.

18. The system of claim 15, wherein assigning the predetermined event site as a current location of the tracking device is also based at least in part on an artificial intelligence algorithm using historical trip data.

19. The system of claim 15, wherein assigning the predetermined event site as a current location of the tracking device is also based at least in part on the predetermined event site being a nearest event site in the hierarchical logistics flow.

20. The system of claim 15, wherein the operations further comprise:
monitoring the tracking device for a second predetermined sequence of movements;
responsive to detecting the second predetermined sequence of movements, determining whether a second location of the second predetermined sequence of movements of the tracking device is within the predetermined event site; and
responsive to the second location not being within the predetermined event site, sending a data ping with second location information.

* * * * *